(12) United States Patent
Rose et al.

(10) Patent No.: US 8,440,276 B2
(45) Date of Patent: May 14, 2013

(54) MULTIDIRECTIONALLY REINFORCED SHAPE WOVEN PREFORMS FOR COMPOSITE STRUCTURES

(75) Inventors: Donald Rose, York, ME (US); Jonathan Goering, York, ME (US); Steve Biddle, Alton, NH (US)

(73) Assignee: Albany Engineered Composites, Inc., Rochester, NH (US)

( * ) Notice: Subject to any disclaimer, the term of this patent is extended or adjusted under 35 U.S.C. 154(b) by 1143 days.

(21) Appl. No.: 12/029,223

(22) Filed: Feb. 11, 2008

(65) Prior Publication Data

US 2009/0202763 A1    Aug. 13, 2009

(51) Int. Cl.
| | |
|---|---|
| *B32B 23/00* | (2006.01) |
| *B32B 1/00* | (2006.01) |
| *B32B 1/08* | (2006.01) |
| *B32B 27/02* | (2006.01) |
| *B32B 27/30* | (2006.01) |
| *B32B 27/36* | (2006.01) |
| *B32B 5/26* | (2006.01) |
| *B32B 25/02* | (2006.01) |
| *B32B 27/38* | (2006.01) |
| *B32B 27/04* | (2006.01) |
| *D06P 7/00* | (2006.01) |
| *D04C 1/00* | (2006.01) |
| *D03D 9/00* | (2006.01) |
| *D03D 11/00* | (2006.01) |
| *D03D 13/00* | (2006.01) |

(52) U.S. Cl.
USPC ..... 428/34.5; 428/36.1; 428/36.6; 428/36.91; 442/20; 442/204; 442/205; 442/206; 442/207; 442/246; 442/250; 442/253; 442/254; 87/1; 87/8; 87/9; 87/11; 87/13

(58) Field of Classification Search .......... 428/34.1, 428/35.7, 36.1–36.3, 36.6, 36.9, 36.91, 34.5; 87/1, 2, 8, 9, 11, 13; 442/20, 204–207, 246, 442/248–254
See application file for complete search history.

(56) References Cited

U.S. PATENT DOCUMENTS

| | | | |
|---|---|---|---|
| 4,086,378 A | * | 4/1978 | Kam et al. .......... 428/34.5 |
| 4,847,063 A | | 7/1989 | Smith |

(Continued)

FOREIGN PATENT DOCUMENTS

| | | |
|---|---|---|
| EP | 0 654 344 A | 5/1995 |
| EP | 0 721 835 A | 7/1996 |

OTHER PUBLICATIONS

International Search Report and Written Opinion issued by European Patent Office on May 12, 2009 for corresponding international application PCT/US2009/033521.

*Primary Examiner* — Walter B Aughenbaugh
(74) *Attorney, Agent, or Firm* — Frommer Lawrence & Haug LLP; Ronald R Santucci

(57) ABSTRACT

The present invention relates to multidirectionally reinforced fiber preforms that conform easily to complex curvatures, such as, composite turbine fan cases, jet engine containment rings, aircraft fuselage frames, aircraft window frames, and flanged rings for attaching nacelles to aircraft engines. The present invention provides multidirectionally reinforced shape woven preforms with improved strength for composite structures that are axisymmetric as well as non-axisymmetric in nature. The invention is a preform used to reinforce a composite structure which includes a contour woven fabric portion, bi-axially braided, tri-axially braided or bias fabric portion, and/or a polar woven fabric portion, and a method of making thereof. The preform may optionally include a three-dimensionally woven portion. The combination of different forms of fabrics allows the preform to be produced without cutting and darting of the individual plies. Eliminating these cuts and darts improves the strength and performance of the resulting structure.

18 Claims, 9 Drawing Sheets

U.S. PATENT DOCUMENTS

| | | |
|---|---|---|
| 5,070,914 A | 12/1991 | Fukuta et al. |
| 5,085,252 A | 2/1992 | Mohamed et al. |
| 5,394,906 A | 3/1995 | Farley |
| 5,465,760 A | 11/1995 | Mohamed et al. |
| 5,619,903 A | 4/1997 | Rogers et al. |
| 5,783,278 A * | 7/1998 | Nishimura et al. ............ 428/102 |
| 5,809,805 A * | 9/1998 | Palmer et al. ................. 66/84 A |
| 6,086,968 A | 7/2000 | Horovitz |
| 6,129,122 A | 10/2000 | Bilisik |
| 6,281,149 B1 | 8/2001 | Hussein et al. |
| 6,283,168 B1 | 9/2001 | Gu et al. |
| 6,315,007 B1 | 11/2001 | Mohamed et al. |
| 6,345,598 B1 | 2/2002 | Bogdanovich et al. |
| 6,439,096 B1 | 8/2002 | Mungalov et al. |
| 6,446,675 B1 | 9/2002 | Goering |
| 6,447,886 B1 | 9/2002 | Mohamed et al. |
| 6,647,852 B1 * | 11/2003 | Freitas et al. ....................... 87/1 |
| 6,786,457 B2 * | 9/2004 | Dockter et al. ................ 244/219 |
| 6,995,099 B1 | 2/2006 | Nishimura et al. |
| 2003/0119398 A1 | 6/2003 | Bogdanovich et al. |
| 2003/0222371 A1 | 12/2003 | Edelmann et al. |
| 2005/0186081 A1 | 8/2005 | Mohamed |
| 2007/0189902 A1 | 8/2007 | Mohamed |

* cited by examiner

MULTIDIRECTIONALLY REINFORCED SHAPE WOVEN PREFORMS FOR COMPOSITE STRUCTURES

BACKGROUND OF THE INVENTION

1. Field of the Invention

The present invention relates to woven preforms for reinforced composite materials and, in particular, to multidirectionally reinforced shape woven preforms for composite structures.

2. Incorporation by Reference

All patents, patent applications, documents, references, manufacturer's instructions, descriptions, product specifications, and product sheets for any products mentioned herein are incorporated herein by reference, and may be employed in the practice of the invention.

3. Description of the Prior Art

The use of reinforced composite materials to produce structural components is now widespread, particularly in applications where their desirable characteristics are sought of being light in weight, strong, tough, thermally resistant, self-supporting and adaptable to being formed and shaped. Such components are used, for example, in aeronautical, aerospace, satellite, recreational (as in racing boats and autos), and other applications.

Typically such components consist of reinforcement materials embedded in matrix materials. The reinforcement component may be made from materials such as glass, carbon, ceramic, aramid, polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials, such as very high strength, are imparted to the completed composite component. The constituent reinforcement materials typically, may be woven, knitted, nonwoven or otherwise oriented into desired configurations and shapes for reinforcement preforms. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, matrix material may be introduced to and into the preform, so that typically the reinforcement preform becomes encased in the matrix material and matrix material fills the interstitial areas between the constituent elements of the reinforcement preform. The matrix material may be any of a wide variety of materials, such as epoxy, phenolic, polyester, vinylester, ceramic, carbon and/or other materials, which also exhibit desired physical, thermal, chemical and/or other properties. The materials chosen for use as the matrix may or may not be the same as that of the reinforcement preform and may or may not have comparable physical, chemical, thermal or other properties. Typically, however, they will not be of the same materials or have comparable physical, chemical, thermal or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified mass of the matrix material normally is very strongly adhered to the reinforcing material (e.g., the reinforcement preform). As a result, stress on the finished component, particularly via its matrix material acting as an adhesive between fibers, may be effectively transferred to and borne by the constituent material of the reinforcement preform.

Frequently, it is desired to produce components in configurations that are other than such simple geometric shapes as (per se) plates, sheets, rectangular or square solids, etc. A way to do this is to combine such basic geometric shapes into the desired more complex forms. One such typical combination is made by joining reinforcement preforms made as described above at an angle (typically a right-angle) with respect to each, other. Usual purposes for such angular arrangements of joined reinforcement preforms are to create a desired shape to form a reinforcement preform that includes one or more end walls, or to strengthen the resulting combination of reinforcement preforms and the composite structure which it produces against deflection or failure upon it being exposed to exterior forces, such as pressure or tension. In any case, a related consideration is to make each juncture between the constituent components as strong as possible. Given the desired very high strength of the reinforcement preform constituents per se, weakness of the juncture becomes, effectively, a "weak link" in a structural "chain".

In related art, U.S. Pat. No. 4,847,063 is taught a hollow, carbon/carbon composite article around an axis of symmetry, in which a heat refractory mandrel is shaped to provide a desired inner surface configuration, and one or more plies of thermally stable carbon filaments are braided over the surface of the mandrel. The plies are then impregnated with a carbonizable liquid impregnant, and the assembly of impregnated plies and mandrel is heat treated so as to carbonize the impregnant.

U.S. Pat. No. 5,070,914 relates to a triaxial textile fabric for use as a reinforcing textile fabric for a composite material wherein the modulus of elasticity is made isotropic and the fabric is deformed into a three-dimensional configuration without changing the orientation angles. The fabric comprises a large number of oblique yarns extending in a radial direction from the center of the textile fabric, and a circumferential yarn woven spirally in a circumferential direction between the oblique yarns. Each of the adjacent oblique yarns is interlaced with each other and the circumferential yarn is woven between the interlaced oblique yarns such that such interlacing appears between each adjacent coil of the spirally woven circumferential yarn. The interlacing step takes place after insertion of the circumferential yarn and before an upward and downward movement of the alternate oblique yarns.

U.S. Pat. No. 5,619,903 teaches a braided preform for composite structures, having a longitudinal axis and a plurality of braided strands of structural fiber. An elongated member, a pultruded rod, having a rigidity greater than that of the strands of structural fiber is intertwined into the braided strands parallel to the longitudinal axis of the braided member, which is a triaxially braided tube.

While the prior art has sought to improve upon the structural integrity of the reinforced composite and has achieved success, there exists a desire to improve thereon or address the problem through an approach different from those disclosed above. In this regard, one approach might be by creating a woven three-dimensional ("3D") structure by specialized machines. Another approach would be to weave a two dimensional ("2D") structure and fold it into shape. However, this typically results in parts that distort when the preform is folded. The distortion occurs because the lengths of fiber as-woven are different than what they should be when the preform is folded. This causes dimples and ripples in areas where the as-woven fiber lengths are too short, and buckles in the areas where fiber lengths are too long. These distortions cause undesirable surface anomalies and reduce the strength and stiffness of the component. While this may be relieved by cutting and darting, such a procedure is undesirable, since it is labor intensive or otherwise may compromise the integrity of the preform. Axisymmetric 3D preforms are therefore desirable because they provide increased strength relative to 2D laminated composites. These preforms are particularly useful in applications that require the composite to carry out-of-plane loads, such as in aerospace applications.

Other techniques include filament winding, which is a continuous fiber placement technique whereby fibers are wrapped around a mandrel. This fabrication technique is not applicable to all geometrical shapes. For example, fiber bridging occurs along surfaces that have concave shapes. Furthermore, it is difficult to obtain a uniform coverage of material in a curved section using filament winding. Although filament winding is a highly automated technology, filament winding a complex shape multi-layer laminate can require considerable time due to the low material dispensing rate.

Tow placement is a technology similar to filament winding in that single/multiple tows or ribbons of material are dispensed onto a mandrel. Unlike filament winding, the tows can be discontinuous in length and tows can be placed along concave surfaces. Using discontinuous tows, it is possible to obtain near uniform coverage of material across a curved part and it is possible to maintain the desired fiber angle. However, the process can be slow and restricted to preimpregnated materials, and therefore expensive.

U.S. Pat. No. 5,394,906 (hereinafter merely, "the '906 patent") relates to an apparatus for fabricating straight or curved planar or three-dimensional fabrics for fabrication into composite structures. The fill yarns are inserted between layers of warp yarns, and a canted or curved reed, depending on the orientation of the fill yarns, is used to compact or "beat-up" the fill yarns. The '906 patent further discloses that the warp yarns of the fabric can be curved using a conical or a combination of conical and cylindrical rollers to effect differential fabric take-up of the warp yarns for obtaining a constant radius of curvature of the warp yarns. In a further embodiment, the '906 patent discloses a clamping bar fabric take-up device used to effect the differential fabric take-up of the warp yarns for obtaining straight warp yarns, curved warp yarns with a constant radius of curvature, curved warp yarns with a non-constant radius of curvature, or some combination of straight and curved warp yarns. In yet another embodiment, flanges for a curved 'C' shape are formed by alternately inserting the warp yarns through adjacent dent wires of the reed to permit vertical weaving of the flanges. These features, however, require custom designed weaving machines that use canted or curved reeds to insert fill yarns between the warp yarns. The machine also requires a special design for its "beat-up" mechanism, which again depends on the orientation of the fill yarns in the structure. The production of a special weaving machine merely to produce a particular design structure is not only expensive, but also is confined to that particular design. Additionally, these machines run at speeds relatively slower than the conventional weaving machine, because the insertion of the fill yarn follows a canted or curved path, which drastically reduces the loom speed.

U.S. Pat. No. 6,086,968 (hereinafter merely, "the '968 patent") provides woven materials having a variety of two- and three-dimensional shapes. The materials are constructed by continuously varying the density and/or directions of the warp and/or weft fibers or yarns at will during the mechanical weaving process. These materials are woven around an object and are impregnated thereafter with matrix material.

While the '906 and '968 patents offer advantages over other prior art discussed above, for many structural applications that are not truly axisymmetric, additional structural features need to be added to reinforce the structure and provide mechanical stability in all directions. Accordingly, mere use of conventional 2D or 3D woven preforms does not adequately provide the required strength in all directions. Therefore, it would be an advancement in the state of the art to provide a structure and method of forming multidirectionally reinforced shaped woven preforms for composite structures that have improved strength in both axisymmetric as well as non-axisymmetric configurations.

SUMMARY OF THE INVENTION

The present invention relates to a method for combining fabrics formed using techniques, such as for example, bi-axial braiding, tri-axial braiding, polar weaving, warp steering weaving, contour weaving, and three-dimensional weaving, to produce a laminate that is multidirectionally reinforced and conforms easily to complex curvatures, such as for example, composite turbine fan cases, jet engine containment rings, aircraft fuselage frames, aircraft window frames, and flanged rings for attaching nacelles to aircraft engines. The present invention provides multidirectionally reinforced shaped woven preforms with improved strength for composite structures that are axisymmetric as well as non-axisymmetric in nature.

The combination of different forms of fabrics allows the preform to be produced without cutting and darting of the individual plies. Eliminating these cuts and darts improves the strength and performance of the resulting structure.

Accordingly, the present invention is directed to fabric preforms that use a combination of textile manufacturing techniques, such as for example, contour weaving, polar weaving, bi-axial braiding, tri-axial braiding, warp steering weaving and three-dimensional weaving to produce a structure that is primarily axisymmetric, but can include some non-axisymmetric reinforcements. Reinforcements are provided in the hoop (0°) and axial (90°) directions as well as reinforcements at ±45° relative to the hoop direction. These performs are used in applications such as composite turbine fan cases, jet engine containment rings, aircraft fuselage frames, aircraft window frames, and flanged rings for attaching nacelles to aircraft engines.

The invention according to one embodiment is an aircraft window frame formed from a multi-element preform comprising a bi-axial braid, a polar woven fabric, a contour woven fabric and a three-dimensionally woven triangular shaped element that fills the gap between the laminated structure of the three elements.

The invention according to one embodiment is an aircraft fuselage frame formed from a multi-element preform comprising a bi-axial braid, a contour woven fabric and a three-dimensionally woven shaped element.

More specifically, one embodiment of the invention is a preform used to reinforce a composite structure including a first portion comprising a plurality of alternating layers of a contour woven fabric and a bias fabric, wherein the contour woven fabric includes one or more layers of warp yarns interwoven with one or more layers of weft yarns, wherein the one or more layers of warp yarns maintain a contour shape in the contour woven fabric, wherein the bias fabric includes a plurality of yarns interwoven at oblique angles to the one or more layers of warp and weft yarns. The preform may further include a second portion comprising a three-dimensionally woven fabric, wherein the second portion is attached to the first portion. The preform further includes a third portion comprising a plurality of alternating layers of a polar woven fabric and the bias fabric, wherein the polar woven fabric is formed by performing differential fabric take-up of a plurality of warp yarns from one side edge of the polar woven fabric to an opposite side edge to create curved warp yarns for imparting a flat curved configuration to the polar woven fabric.

Yet another embodiment of the invention is a composite structure reinforced with a preform including a first portion having a plurality of alternating layers of a contour woven fabric and a bias fabric, wherein the contour woven fabric includes one or more layers of warp yarns interwoven with one or more layers of weft yarns, wherein the one or more layers of warp yarns maintain a contour shape in the contour woven fabric, wherein the bias fabric includes a plurality of yarns interwoven at oblique angles to the one or more layers of warp and weft yarns; and a matrix material. The preform further includes a second portion comprising a three-dimensionally woven fabric, wherein the second portion is attached to the first portion. The preform further includes a third portion comprising a plurality of alternating layers of a polar woven fabric and the bias fabric, wherein the polar woven fabric is formed by performing differential fabric take-up of a plurality of warp yarns from one side edge of the polar woven fabric to an opposite side edge to create curved warp yarns for imparting a flat curved configuration to the polar woven fabric.

Yet another embodiment of the invention is a method of manufacturing a preform used to reinforce a composite structure including the steps of forming a first portion by layering a plurality of alternating layers of a contour woven fabric and a bias fabric, wherein the contour woven fabric is formed by interweaving one or more layers of warp yarns with one or more layers of weft yarns, wherein the one or more layers of warp yarns maintain a contour shape in the contour woven fabric after being woven, wherein the bias fabric is formed by interweaving a plurality of yarns at oblique angles to the one or more layers of warp and weft yarns. The method further includes the steps of forming a second portion by three-dimensionally weaving a fabric; and attaching the second portion to the first portion. The method may also include the step of forming a third portion by layering a plurality of alternating layers of a polar woven fabric and the bias fabric, wherein the polar woven fabric is formed by performing differential fabric take-up of a plurality of warp yarns from one side edge of the polar woven fabric to an opposite side edge to create curved warp yarns for imparting a flat curved configuration to the polar woven fabric.

Yet another embodiment of the invention is a method of manufacturing a three-dimensional composite structure reinforced with a preform comprising the steps of forming a first portion of the preform by layering a plurality of alternating layers of a contour woven fabric and a bias fabric, wherein the contour woven fabric is formed by interweaving one or more layers of warp yarns with one or more layers of weft yarns, wherein the one or more layers of warp yarns maintain a contour shape in the contour woven fabric after being woven, wherein the bias fabric is formed by interweaving a plurality of yarns at oblique angles to the one or more layers of warp and weft yarns; and impregnating the preform with a matrix material. The method further includes the steps of forming a second portion of the preform by three-dimensionally weaving a fabric; and attaching the second portion to the first portion. The method may also include the step of forming a third portion of the preform by layering a plurality of alternating layers of a polar woven fabric and the bias fabric, wherein the polar woven fabric is formed by performing differential fabric take-up of a plurality of warp yarns from one side edge of the polar woven fabric to an opposite side edge to create curved warp yarns for imparting a flat curved configuration to the polar woven fabric.

Therefore, an object of the present invention is to eliminate the need to cut and dart individual reinforcing fabrics or plies for three-dimensional structures.

It is a further object as part of this to simplify the manufacture of such structures and reduce the labor requirement.

Yet another object of the invention is to provide for a three-dimensional preform which is of a design which is an alternative to and/or an improvement on existing preforms and/or reinforced composite structures heretofore available.

Yet another object of the invention is to provide for such a three-dimensional preform which may be formed into shape without distortion of the fibers comprising the preform.

A still further object is to provide for a method of creating a reinforcing fabric which may be readily adapted to create a wide variety of different three-dimensional structures.

It is yet another object of the present invention to provide a method for producing a fabric or fiber preform that maintains the appropriate fiber orientation, overall geometry and uniformity of layer thickness. The proposed invention is not, however, limited to this particular cross-sectional geometry or the 0, 90 and +/−45 degree fiber orientation. In fact, the fiber angle can be specified as a function of position along the structure, and the width of the fabric can change along the length of the structure.

Another object of the present invention is to facilitate the fabrication of a broad range of preforms that can be used to make less expensive, structurally efficient composite structural parts that have previously been expensive, structurally inefficient or unfabricable.

These and other objects and advantages will be apparent from the present invention. The present invention is directed toward providing a specially designed perform suitable as the reinforcement for a three-dimensional composite structure. The fiber reinforcement is one that may be woven on conventional weaving machinery and then folded into its final shape prior to impregnation of resin without producing an undesirable distortion in the fibers. This is accomplished by adjusting the length of the fibers during weaving such that some are short in some areas and long in others. The fibers are then equalized when the preform is folded into shape providing for a smooth transition at the fold. See for example U.S. Pat. No. 6,446,675, the disclosure of which is incorporated herein by reference. Also, while reference is made to woven preforms, its applicability to nonwovens, such as braided or stitched bonded, for example, will be apparent to one skilled in the art.

For a better understanding of the invention, its operating advantages and specific objects attained by its uses, reference is made to the accompanying descriptive matter in which preferred, but non-limiting, embodiments of the invention are illustrated.

Terms "comprising" and "comprises" in this disclosure can mean "including" and "includes" or can have the meaning commonly given to the term "comprising" or "comprises" in U.S. patent Law. Terms "consisting essentially of" or "consists essentially of" if used in the claims have the meaning ascribed to them in U.S. patent Law. Other aspects of the invention are described in or are obvious from (and within the ambit of the invention) the following disclosure.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings.

DETAILED DESCRIPTION OF THE PREFERRED EMBODIMENTS

Figure 1A:
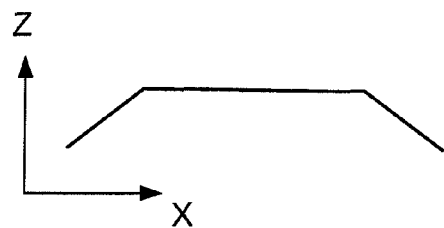
FIGS. 1(a) & 1(b) show steps in a method of preparation of a multidirectionally reinforced preform according to one embodiment of the invention.

The instant invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

In the following description, like reference characters designate like or corresponding parts throughout the figures. Additionally, in the following description, it is understood that such terms as "upper," "lower," "top" and "bottom" and the like are words of convenience and are not to be construed as limiting terms.

Turning now to the figures, the invention according to one embodiment is a method of fabricating a multidirectionally reinforced fiber preform for use in high-strength applications, such as for example, a composite turbine fan case, jet engine containment ring, an aircraft fuselage frame, an aircraft window frame or in flanged rings for attaching nacelles to aircraft engines.

The method according to this embodiment uses a combination of two or more textile manufacturing techniques, such as for example, contour weaving, polar weaving, bi-axial braiding, tri-axial braiding, warp steering weaving, bias weaving, and three-dimensional weaving to fabricate a structure that is primarily axisymmetric, but may also include some non-axisymmetric features. The terms "warp steering" and "polar weaving" will be described in more detail in later parts of this section.

Figure 2:
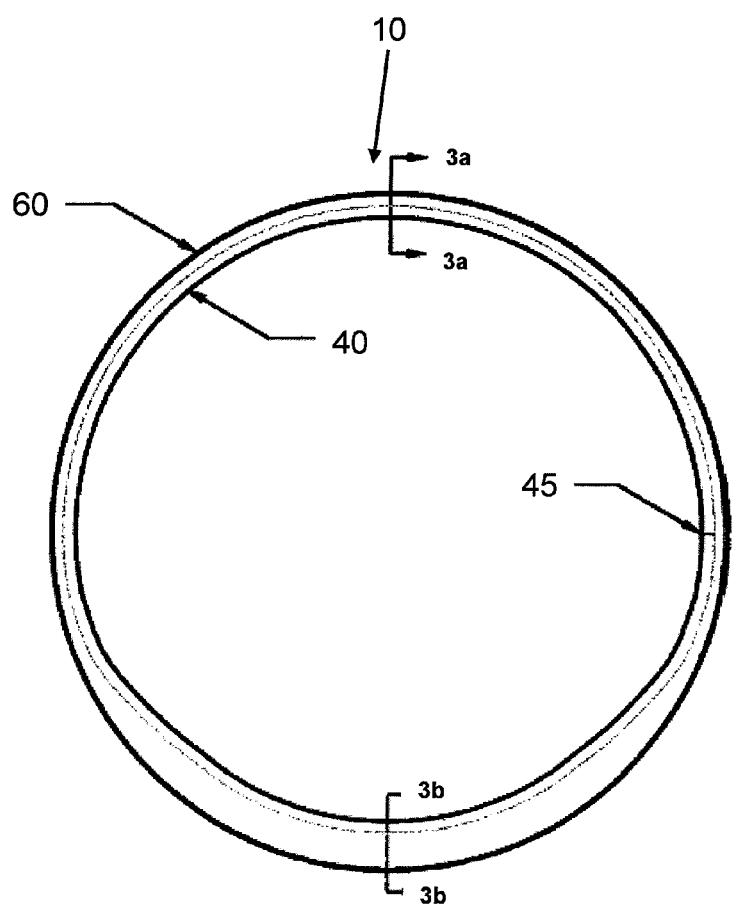
FIG. 2 shows a multidirectionally reinforced preform according to one aspect of the invention.
Figure 3A:
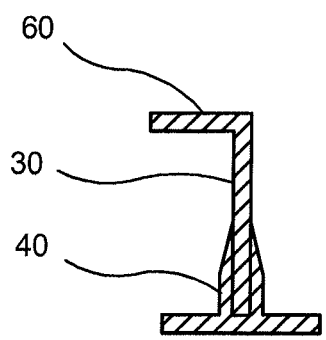
FIGS. 3(a) & 3(b) show a cross-sectional view of the multidirectionally reinforced preform shown in FIG. 2.
Figure 3B:
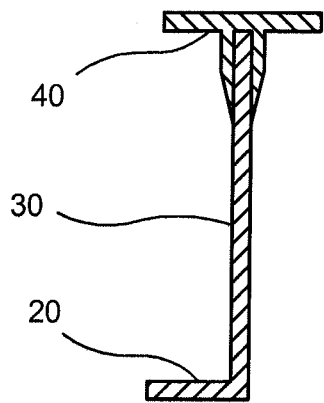

Contour weaving, according to one embodiment of the invention, is used to produce axisymmetric preforms by forming the fabric around a mandrel. For instance, a series of rollers that are specially designed for a specific shape can be used for forming the preform. Contour weaving uses a special take up system to produce preforms that have warp fibers with different lengths. The different warp lengths give the resulting fabrics some curvature, out of the fabric plane. In the case of contour weaving, the fabric is designed so that it takes on a specific cross sectional shape, such as for example shown in FIG. 1(a). An example of a multidirectionally reinforced structure or fiber preform formed according to one embodiment of the invention is shown in FIG. 2. The figure depicts a fuselage frame 10, whose cross-sectional view, illustrating top and bottom portions of the frame 10, are shown in FIGS. 3(a) and 3(b). A fuselage frame is a structural element in typical aircraft designs. There are typically many such frames in a fuselage and they provide circumferential reinforcement in the aircraft structure.

Figure 4:
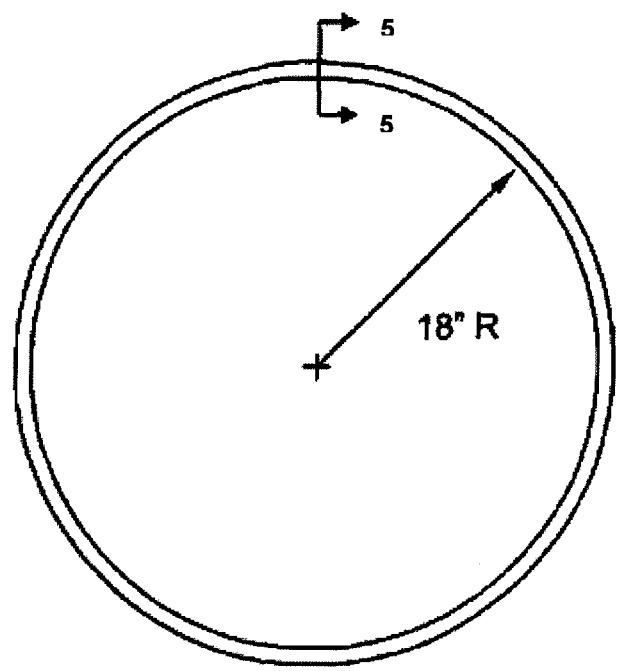
FIG. 4 shows a multidirectionally reinforced flanged ring preform according to one embodiment of the invention.
Figure 5:
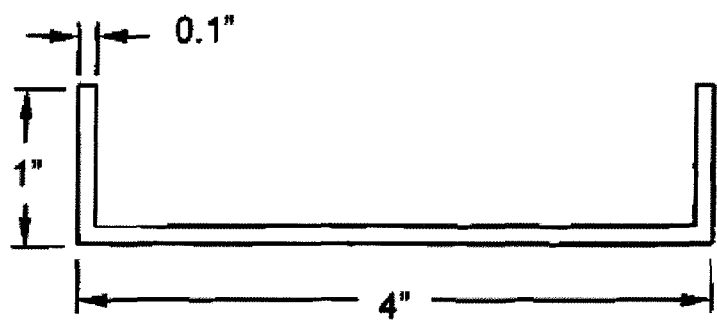
FIG. 5 shows a cross-sectional view of the multidirectionally reinforced preform shown in FIG. 4.
Figure 6A:
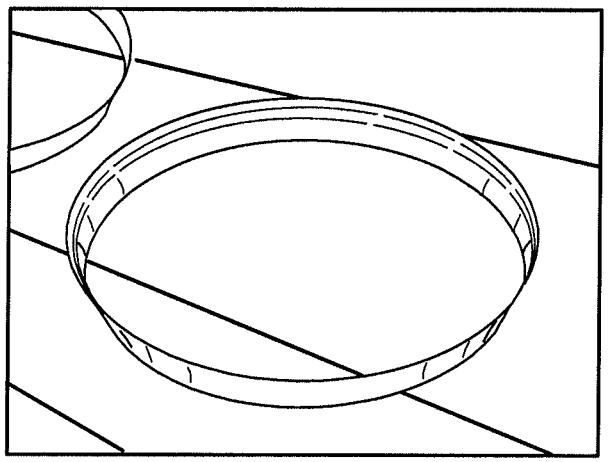
FIGS. 6a and 6b show photos of a multidirectionally reinforced perform according to one embodiment of the invention.
Figure 6B:
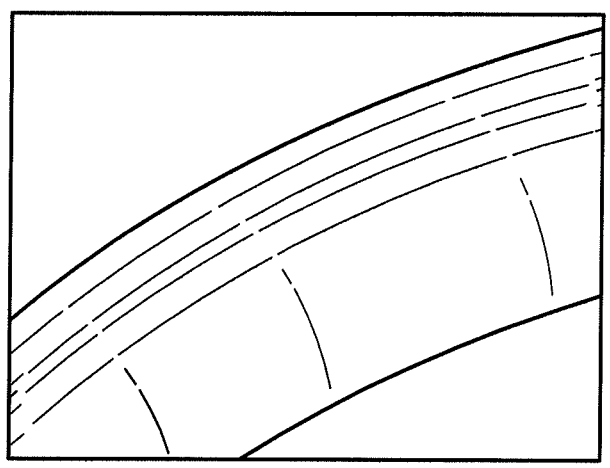

The frame 10 has a circular structure with its top and bottom portions having a desired width and thickness. Fabrication of the main portion of the frame 10 begins by contour weaving a continuous fabric. The process of contour weaving involves feeding warp yarns in a contoured shape using a shaped mandrel or the like, such that the fabric produced on the loom maintains the contoured shape even after being taken off the loom. The warp and fill (or weft) yarns maintain a 0° and 90° orientation in the fabric, thereby providing reinforcement in the 0° and 90° directions, where 0° is in the hoop direction (perpendicular to the radial direction) and 90° is the radial direction of the final structure or frame 10. Contour weaving can also result in a fabric that contains warp fibers of different lengths so the fabric is predisposed to take on a specific axisymmetric shape when wrapped onto a mandrel. The mandrel can be of practically any desired shape or size depending on the desired final structure. The mandrel may or may not have provisions for flanges on one or both sides of the ring, based on whether or not continuous flanged rings are required in the end product. This allows cylindrical, annular, and/or conical portions of the structure to be combined into a single preform. For example, on the fuselage frame shown in FIG. 2, there is a cylindrical portion that forms the outer flange 20 and an annular portion that forms the leg 30 (shown in FIG. 3(b)). Similarly, the generic double-flanged ring shown in FIGS. 6a and 6b has flanges on both ends. The front and cross-sectional views of such a double-flanged ring are shown in FIGS. 4 and 5 respectively.

Figure 1B:
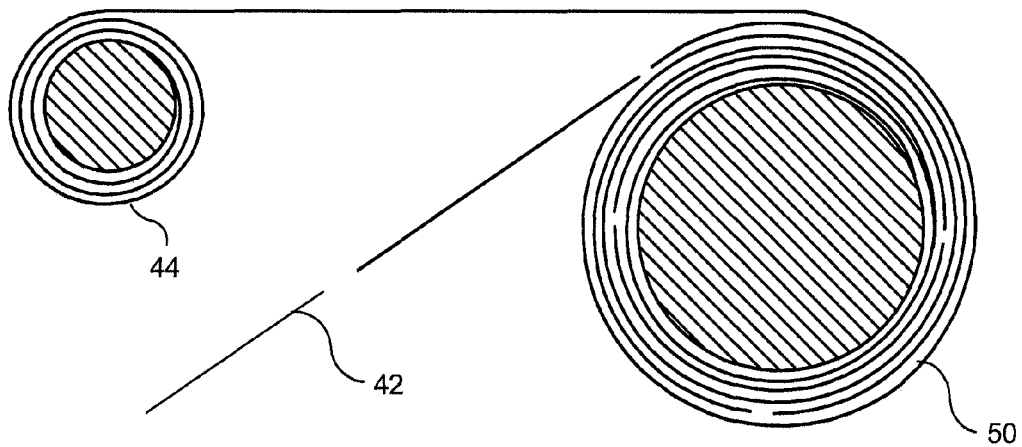

One of the drawbacks of contour weaving is that there is no bias or non-hoop or non-radial reinforcement in the structure. This reinforcement is typically required to improve the shear and/or bearing strength when the preform is processed into a composite. In the present invention, this feature is provided by interspersing one or more layers of bias fabric 42 between the one or more layers of contour fabric 44 as it is wrapped onto a mandrel, as shown in FIG. 1(b). The bias fabric 42 can be continuous or discontinuous, and can be fabricated using any convenient method, such as cutting a conventional 2D fabric at ±45° or slitting a ±45° braided tube.

In contrast to the contour woven fabric, the bias fabric 42 is not predisposed to take the desired cross sectional shape. However, the fibers in this fabric are free to 'scissor' as it is wrapped around corners to form features such as flanges. This moves fiber away from being true ±45° reinforcement, but this effect is relatively small for most practical applications and is negligible for very large diameter structures.

The contour woven fabric 44 with inserted bias plies 42 thus results in an axisymmetric structure 50 with a cross section that resembles a laminated composite. This laminate composite structure thus has a isotropic configuration (i.e. equal amounts of fiber in the 0°, 90°, +45°, and −45° directions); however, the invention is not limited to this configuration.

For applications that are truly axisymmetric, additional features such as an inner flange 60, circumferential stiffeners, or intermediate attachment rings, as mentioned earlier may be formed using the contour woven fabric 44 and/or the bias fabric 42. Many structural applications, however, are not truly axisymmetric, and in such cases, additional structural features may be added to the preform using three-dimensional woven preforms such as Pi preform 40 shown in FIGS. 3(*a*) and 3(*b*). The use of a symmetric Pi preform 40 is shown merely as an example, but practically any shape possible with three-dimensional weaving can be used for this purpose. Features formed by attaching additional three-dimensional woven preforms require a splice in the hoop direction, but this splice can usually be located in a more lightly loaded portion 45 of the structure so that a significant strength penalty is avoided. The Pi preform 40 may be formed according to the method disclosed in U.S. Pat. No. 6,446,675 heretofore referred to.

The contour woven fabric, bias fabric and the Pi preform may be made from materials, such as for example, carbon, nylon, rayon, polyester, fiberglass, cotton, glass, ceramic, aramid, and polyethylene, or any other material commonly known in the art. The final structure may be impregnated with a matrix material, such as for example, epoxy, polyester, vinyl-ester, ceramic, and carbon, using resin impregnation methods such as resin film infusion (RFI), resin transfer molding or chemical vapor filtration, thereby forming a three-dimensional composite structure.

Accordingly, one embodiment of the invention is a three-dimensional composite structure reinforced with a woven preform and a method of forming thereof including a first portion having a plurality of alternating layers of a contour woven fabric and a bias fabric, wherein the contour woven fabric includes one or more layers of warp yarns interwoven with one or more layers of weft yarns, wherein the one or more layers of warp yarns maintain a contour shape in the contour woven fabric, wherein the bias fabric includes a plurality of yarns interwoven or braided at oblique angles to the one or more layers of warp and weft yarns; and a matrix material. The composite structure further includes a second portion comprising a three-dimensionally woven fabric, wherein the second portion is attached to the first portion.

The primary advantages of the invention are: 1) Relative to a cylindrical coordinate system, the preforms according to the present invention have continuous reinforcement in the hoop and axial directions as well as reinforcement at ±45° relative to the hoop direction. This improves both the strength and stiffness of the resulting composite component; 2) the preform is engineered to take the desired shape without the need for cutting and darting, thereby eliminating discontinuities in the hoop fiber. This reduces the hand labor required to construct the preform as well as resulting in improved strength. The other advantages include: 3) maintaining the desired fiber orientation along the curved section; 4) uniform material coverage from inner to outer radial points along the curved section; 5) producing the required cross-sectional geometry; and 6) cost effectiveness.

The invention according to a further embodiment is a method for combining warp steering, polar weaving, contour weaving, bi-axial braiding, tri-axial braiding and/or three-dimensional weaving to produce a laminate that conforms easily to complex curvatures, such as for example, an aircraft window frame.

Figure 10:
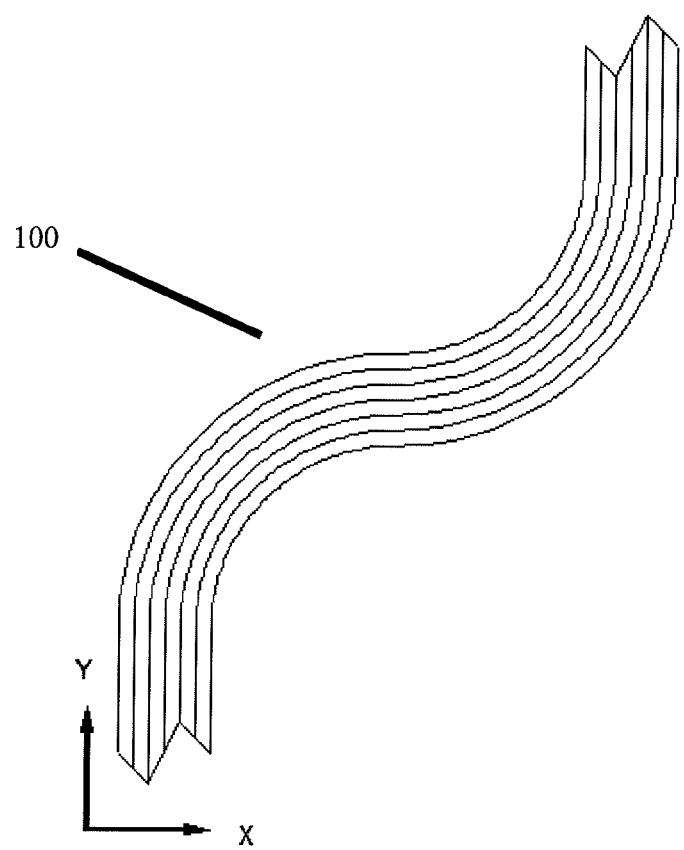
FIG. 10 shows a step in a method of preparation of a multidirectionally reinforced preform according to one embodiment of the invention.

The term "warp steering" refers to a differential take-up system for the warp yarns, which 'steers' them into a required shape, and allows straight weaving, polar weaving or a combination thereof to produce a preform that can practically take any shape in the X-Y plane of the fabric or preform. An example of such a warp steered fabric is shown in FIG. 10, where the fabric 100 is flat in one plane, and has a curved shape in the X-Y plane. In such an arrangement, each warp yarn can have a different path length. Both warp steering and contour weaving use special take up systems to produce fabrics that have warp fibers with different lengths. The different warp lengths give the resulting fabrics some curvature (in the plane of the fabric for warp steering and out of the plane for contour weaving). In the case of warp steering, the fabric is woven so that it remains flat, whereas in contour weaving, the fabric is designed so that it takes on a specific cross-sectional shape.

Figure 7:
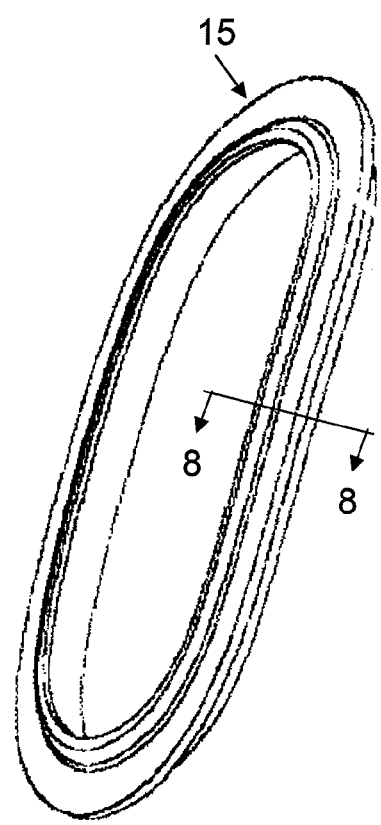
FIG. 7 shows a multidirectionally reinforced preform according to one aspect of the invention.
Figure 8:
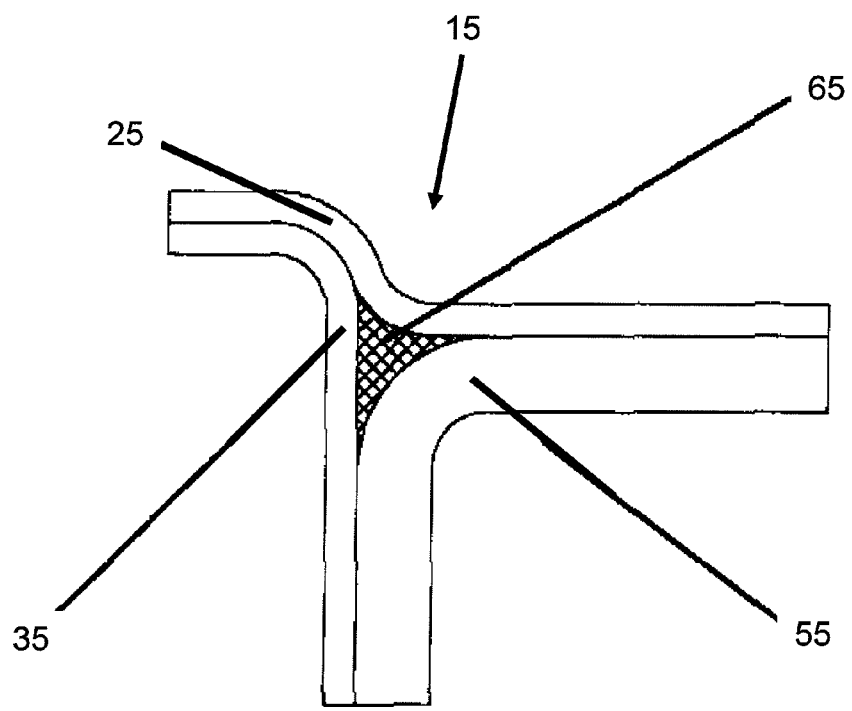
FIG. 8 show a cross-sectional view of the multidirectionally reinforced preform shown in FIG. 7.

The invention according to one embodiment is an aircraft window frame 15 as shown in FIG. 7. A cross-sectional view depicting the elements that make up this multi-element structure or window frame 15 is shown in FIG. 8. The structure 15 comprises four different woven forms, which are used in its production. The combination of these forms allows the perform to be produced without cutting and darting of the individual plies. Eliminating these cuts and darts improves the strength as well as performance of the resulting structure.

Figure 9:
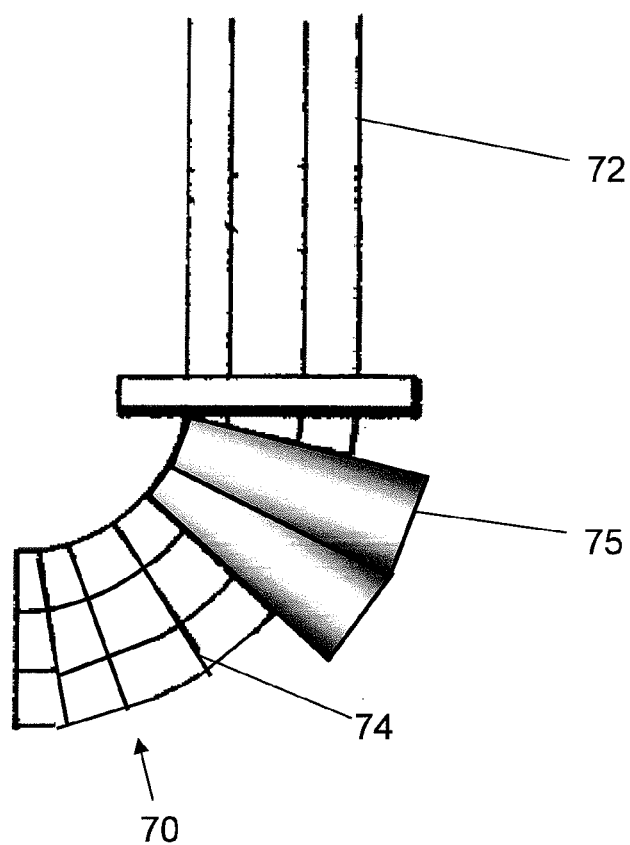
FIG. 9 shows a step in a method of preparation of a multidirectionally reinforced preform according to one embodiment of the invention.

The structure or frame 15, includes a top wrap 25, an inner wrap 35, an outer wrap 55 and a gap filler 65. The top wrap 25 is an alternating lay-up of layers of a bias fabric and a polar woven or contour woven fabric. The bias fabric can be continuous or discontinuous, and can be fabricated using any convenient method, such as cutting a conventional two-dimensional fabric at ±45° or slitting a ±45° biaxial braided tube. The polar woven fabric 70 with warp fibers or yarns 72 oriented in a radial direction and the fill fibers or yarns 74 in the hoopwise direction is woven with a radius of curvature that matches the in-plane geometry of the top wrap 25, as shown in FIG. 9. In particular, polar weaving is a method for curving the warp yarns of the structure, while maintaining the appropriate fill yarn 74 orientation. This is accomplished by modifying the fabric take-up system. In particular, the fabric 70 is woven using a differential fabric take-up system such as using conical and/or cylindrical rollers 75 shown in FIG. 9. The smaller diameter portions of the conical rollers pull the warp yarns (i.e., fabric) less per roller revolution than the larger diameter portion of the roller. This differential take-up of the warp yarns 72 causes the fabric to curve, thus giving the polar shape to the fabric 70, whose lengthwise edges can be joined by either interweaving the warp yarns together or using other end joining techniques known in the art. The polar fabric 70 can be woven in a circular shape and formed into annular shapes such as oval or racetrack shapes, depending on the shape of the desired final structure. If warp steering is used, the annular shape can be woven directly and does not require any additional forming.

By laying a bi-axial braid over layers of a polar woven fabric 70 or vice versa, an equal distribution of 0, 90 and +/−45 degree reinforcement due to multi-directional fiber orientation can be achieved, thus forming a laminate of two or more layers. The braid consists of sleeving that, by the scissoring action of the braid, conforms to the curvature of the surface, as described earlier.

Returning now to FIG. 8, the outer wrap 55 and the inner wrap 35 are similar to each other in that both are constructed of alternating layers of bias fabrics and contour woven fabrics, as described in the previous embodiment. The bias fabric can be continuous or discontinuous, and can be fabricated using any convenient method, such as cutting a conventional two-dimensional fabric at ±45° or slitting a ±45° biaxial braided tube. In this case, the contour weave is able to conform to the shape of the component without having to be cut or darted. Like the polar fabric, the contour fabric provides the 0, 90 degree reinforcement and the braid provides the +/−45 degree reinforcements. The structure or frame 15 may also include a gap filler 65, which may be a three dimensional woven triangular shaped element that fills the gap between the top wrap 25, inner wrap 35 and outer wrap 55, as shown in FIG. 8. Other forms of media, such as a nonwoven fabric, may also be used for gap filler this purpose; however the invention is not limited to the use of just the three-dimensional woven fabric and/or the nonwoven fabric.

The contour woven fabric, bias woven fabric, braided, polar woven fabric, warp steered fabric and the three-dimensional woven fabric may be made from materials, such as for example, carbon, nylon, rayon, polyester, fiberglass, cotton, glass, ceramic, aramid, and polyethylene, or any other material commonly known in the art. The final structure may be impregnated with a matrix material, such as for example, epoxy, polyester, vinyl-ester, ceramic, and carbon, using resin impregnation methods such as resin film infusion (RFI), resin transfer molding or chemical vapor filtration, thereby forming a three-dimensional composite structure.

Accordingly, one embodiment of the invention is a three-dimensional composite structure reinforced with a preform and a method of making thereof including a first portion having a plurality of alternating layers of a contour woven fabric and a bias fabric, wherein the contour woven fabric includes one or more layers of warp yarns interwoven with one or more layers of weft yarns, wherein the one or more layers of warp yarns maintain a contour shape in the contour woven fabric, wherein the bias fabric includes a plurality of yarns interwoven or braided at oblique angles to the one or more layers of warp and weft yarns; and a matrix material. The composite structure further includes a second portion comprising a three-dimensionally woven fabric, wherein the second portion is attached to the first portion. The composite structure further includes a third portion comprising a plurality of alternating layers of a polar woven fabric and the bias fabric, wherein the polar woven fabric is formed by performing differential fabric take-up of a plurality of warp yarns or warp steering from one side edge of the polar fabric to an opposite side edge to create curved warp yarns for imparting a flat curved configuration to the polar woven fabric.

Therefore, by using the techniques described in the present invention, the following composite structures can be produced:

1—Axisymmetric structures that are entirely contour woven, and include one or more layers of a contour woven preform, such as for example containment rings;

2—Axisymmetric structures that include one or more contour woven fabric layers and one or more bias plies interspersed between the contour woven fabric layers, such as for example flanged rings; and 3—Axisymmetric or non-axisymmetric structures that consist of one or more contour woven fabric layers with or without additional bias plies, and additional elements, such as for example window frames or fuselage frames. The additional elements can include flanges, stiffeners, and/or bias plies made using three-dimensional weaving, polar weaving, and/or braiding. Thus by the present invention, its objects and advantages are realized, and although preferred embodiments have been disclosed and described in detail herein, its scope and objects should not be limited thereby; rather its scope should be determined by that of the appended claims.

What is claimed is:

1. A preform used to reinforce a composite structure comprising:
    a first portion comprising a plurality of alternating fabric layers of a contour woven fabric and a bias fabric,
        wherein said contour woven fabric comprises one or more layers of warp yarns interwoven with one or more layers of well yarns,
        wherein a contoured shape of the contour woven fabric is maintained by said one or more layers of warp yarns having differing warp lengths that give curvature to said contour woven fabric, and
        wherein said bias fabric comprises a plurality of yarns interwoven or braided at oblique angles of about +/−45 degrees to said one or more layers of warp and weft yarns of the contour woven fabric layer.

2. The preform as claimed in claim 1, further comprising:
    a second portion comprising a three-dimensionally woven fabric,
        wherein said second portion is attached to said first portion.

3. The preform as claimed in claim 2, further comprising:
    a third portion comprising a plurality of alternating layers of a polar fabric and said bias fabric,
        wherein said polar fabric is formed by performing differential fabric take-up of a plurality of warp yarns or warp steering from one side edge of the polar fabric to an opposite side edge to create curved warp yarns for imparting a flat curved configuration to the polar fabric.

4. The preform as claimed in claim 1, wherein said bias fabric is a flat fabric woven at +/−45 degrees or a slit braided tube.

5. The preform as claimed in claim 1, wherein said composite structure is a turbine fan case, a jet engine containment ring, an aircraft fuselage frame, an aircraft window frame, or a flanged ring for attaching a nacelle to an aircraft engine.

6. The preform as claimed in claim 1, wherein said preform is axisymmetric and/or non-axisymmetric.

7. The preform as claimed in claim 1, wherein said bias fabric is continuous or discontinuous.

8. The preform as claimed in claim 3, wherein said first, second and third portions are made from materials selected from the group consisting of carbon, nylon, rayon, polyester, fiberglass, cotton, glass, ceramic, aramid, and polyethylene.

9. A three-dimensional composite structure reinforced with a preform comprising:
    a first portion comprising a plurality of alternating layers of a contour woven fabric and a bias fabric,
        wherein said contour woven fabric comprises one or more layers of warp yarns interwoven with one or more layers of weft yarns,
        wherein a contoured shape of the contour woven fabric is maintained by said one or more layers of warp yarns having differing warp lengths that give curvature to said contour woven fabric, wherein said bias fabric comprises a plurality of yarns interwoven or braided at oblique angles of about +/−45 degrees to said one or more layers of warp and weft yarns; and
a matrix material.

10. The composite structure as claimed in claim 9, further comprising:
a second portion comprising a three-dimensionally woven fabric,
wherein said second portion is attached to said first portion.

11. The composite structure as claimed in claim 10, further comprising:
a third portion comprising a plurality of alternating layers of a polar fabric and said bias fabric,
wherein said polar fabric is formed by performing differential fabric take-up of a plurality of warp yarns or warp steering from one side edge of the polar fabric to an opposite side edge to create curved warp yarns for imparting a flat curved configuration to the polar fabric.

12. The composite structure as claimed in claim 9, wherein said bias fabric is a flat fabric woven at +/−45 degrees or a slit braided tube.

13. The composite structure as claimed in claim 9, wherein said composite structure is a turbine fan case, a jet engine containment ring, an aircraft fuselage frame, an aircraft window frame, or a flanged ring for attaching a nacelle to an aircraft engine.

14. The composite structure as claimed in claim 9, wherein said preform is axisymmetric and/or non-axisymmetric.

15. The composite structure as claimed in claim 9, wherein said bias fabric is continuous or discontinuous.

16. The composite structure as claimed in claim 11, wherein said first, second and third portions arc made from materials selected from the group consisting of carbon, nylon, rayon, polyester, fiberglass, cotton, glass, ceramic, aramid, and polyethylene.

17. The composite structure as claimed in claim 9, wherein said composite structure is formed from a process selected from the group consisting of resin film infusion (RFI), resin transfer molding and chemical vapor filtration.

18. The composite structure as claimed in claim 9, wherein said matrix material is selected from the group consisting of epoxy, polyester, vinyl-ester, ceramic, and carbon.

* * * * *

UNITED STATES PATENT AND TRADEMARK OFFICE
CERTIFICATE OF CORRECTION

PATENT NO. : 8,440,276 B2  
APPLICATION NO. : 12/029223  
DATED : May 14, 2013  
INVENTOR(S) : Donald Rose et al.

Page 1 of 1

It is certified that error appears in the above-identified patent and that said Letters Patent is hereby corrected as shown below:

In the Claims:

In claim 1, appearing at column 12, line 18, change "well yarns" to --weft yarns--.

Signed and Sealed this  
Sixth Day of May, 2014

Michelle K. Lee  
*Deputy Director of the United States Patent and Trademark Office*